United States Patent
Bauer et al.

(10) Patent No.: US 6,550,810 B1
(45) Date of Patent: *Apr. 22, 2003

(54) SEAT BELT RETRACTOR

(75) Inventors: Barney J. Bauer, Fenton, MI (US); Roger H. Garrell, Lake Orion, MI (US)

(73) Assignee: TRW Vehicle Safety Systems Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,527

(22) Filed: Mar. 19, 1998

(51) Int. Cl.[7] .............................................. B60R 22/08
(52) U.S. Cl. ...................... 280/803; 297/477; 242/384.2
(58) Field of Search ................................ 286/803, 806; 297/477, 476; 242/384.2, 384, 382

(56) References Cited

U.S. PATENT DOCUMENTS

| | | | |
|---|---|---|---|
| 3,610,361 A | 10/1971 | Pringle | |
| 3,845,836 A | * 11/1974 | Bandler et al. | 280/803 |
| 3,890,003 A | 6/1975 | Close | |
| 4,103,842 A | 8/1978 | Martin et al. | |
| 4,572,543 A | * 2/1986 | Tsuge et al. | 280/807 |
| 4,688,825 A | * 8/1987 | Arbogast et al. | 280/803 |
| 4,895,317 A | 1/1990 | Rumpf et al. | |
| 5,014,926 A | 5/1991 | Rumpf et al. | |
| 5,490,575 A | 2/1996 | Suran et al. | |
| 5,538,098 A | 7/1996 | Sparhawk | |
| 5,553,804 A | 9/1996 | Hamann | |
| 5,568,939 A | 10/1996 | Blackburn et al. | |
| 5,571,253 A | 11/1996 | Blackburn et al. | |
| 5,611,604 A | * 3/1997 | Thomas et al. | 297/478 |
| 5,765,774 A | 6/1998 | Maekawa et al. | |
| 5,788,281 A | 8/1998 | Yanagi et al. | |

FOREIGN PATENT DOCUMENTS

| | | |
|---|---|---|
| DE | 19526619 A1 | 1/1997 |
| DE | 29717477 U1 | 1/1998 |
| JP | 59-179150 | 11/1984 |
| JP | 62-70046 | 5/1987 |
| JP | 1-156155 | 6/1989 |
| JP | 5-72227 | 3/1993 |
| JP | 7277138 | 10/1995 |
| JP | 9-132113 | 5/1997 |
| JP | 9-272401 | 10/1997 |
| WO | WO9749571 | 12/1997 |

OTHER PUBLICATIONS

*Toyota Technical Review*, Toyota Motor Corp., Technology Management Division, Nov. 1996, vol. 46, No. 2, pp. 38–41.
*Journal of the Japan Society of Mechanical Engineers*, Dec. 1977, vol. 100, No. 949, pp. 22–23.

* cited by examiner

*Primary Examiner*—Christopher P. Ellis
*Assistant Examiner*—Richard Ridles
(74) *Attorney, Agent, or Firm*—Tarolli, Sundheim, Covell & Tummino L.L.P.

(57) ABSTRACT

A seat belt retractor (12) comprises a frame (40), a seat belt webbing spool (42) rotatably mounted in the frame (40), and an actuator (70) for locking the seat belt webbing spool (42) against rotation in at least one direction (B) in the frame (40). The actuator (70) is mounted to the frame (40). An accelerometer (82) provides an electrical output signal indicative of vehicle deceleration. The accelerometer (82) is mounted on the frame (40). A controller (84) monitors the electrical output signal and causes the actuator (70) to lock the seat belt webbing spool (42) against rotation in the at least one direction (B) upon the occurrence of a predetermined amount of vehicle deceleration. The controller (84) is mounted on the frame (40).

18 Claims, 3 Drawing Sheets

SEAT BELT RETRACTOR

TECHNICAL FIELD

The present invention relates to a seat belt retractor, and particularly relates to an electrically lockable seat belt retractor.

BACKGROUND OF THE INVENTION

Electrically actuated seat belt retractors are known. In such a seat belt retractor, an electrically actuated locking mechanism blocks rotation of a spool on which seat belt webbing is wound to help protect a vehicle occupant in the event of a vehicle collision. The known vehicle seat belt systems which have electrically actuated seat belt retractors typically utilize a single, centrally located collision sensor and an associated controller. The sensor and controller sense a condition indicative of a vehicle collision and send an electrical signal to each of the electrically actuated seat belt retractors in the vehicle to cause the retractors to lock.

SUMMARY OF THE INVENTION

The present invention is a seat belt retractor comprising a frame, a seat belt webbing spool rotatably mounted in the frame, and actuator means for locking the seat belt webbing spool against rotation in at least one direction in the frame. The actuator means is mounted to the frame. Accelerometer means provides an electrical output signal indicative of vehicle deceleration. The accelerometer means is mounted on the frame. Controller means monitors the electrical output signal and causes the actuator to lock the seat belt webbing spool against rotation in the one direction upon the occurrence of a predetermined amount of vehicle deceleration. The controller means is mounted on the frame.

The present invention further contemplates that a seat belt retractor constructed according to the present invention be used as a part of a vehicle occupant protection apparatus. The apparatus includes an inflatable vehicle occupant protection device, such as an air bag, and/or one or more additional seat belt retractors constructed in accordance with the present invention.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
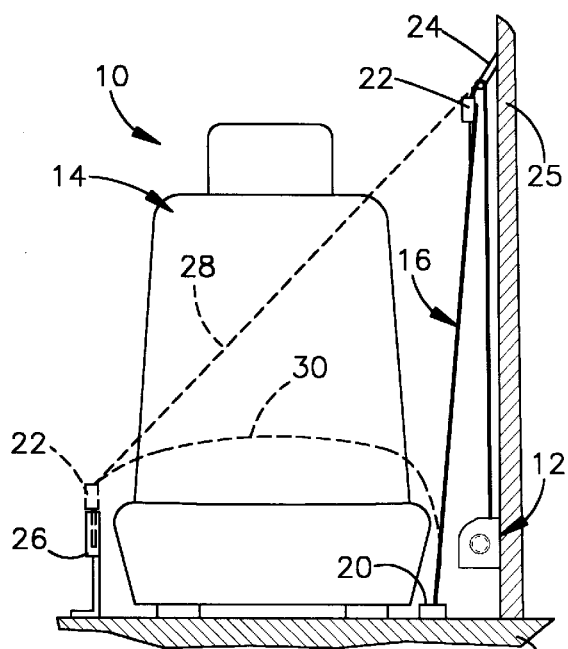
FIG. 1 is a schematic illustration of a vehicle seat belt system having a seat belt retractor constructed in accordance with the present invention.

The present invention relates to an electrically lockable seat belt retractor. The present invention is applicable to various seat belt retractors and systems. As representative of one such seat belt system, FIG. 1 illustrates schematically a three-point continuous loop seat belt system 10 for use in helping to protect an occupant of a vehicle.

The occupant of the vehicle sits on a vehicle seat 14. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a seat belt retractor 12 which is secured to the vehicle body 18 on the same side of the seat 14. Intermediate its ends, the belt webbing 16 passes through a tongue assembly 22 and a D-ring or turning loop 24 that is mounted to a B-pillar 25 above the retractor 12 and the anchor point 20. When the seat belt system 10 is not in use, the belt webbing 16 is wound on the seat belt retractor 12 and is oriented generally vertically on the one side of the seat 14, as shown in solid lines in FIG. 1.

To engage the seat belt system 10, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 12. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 10 is thus buckled, the length of belt webbing 16 is divided by the tongue assembly 22 into a torso portion 28 which extends across the torso of the occupant and a lap portion 30 which extends across the lap of the occupant.

The seat belt retractor 12 has a generally U-shaped metal frame 40 (FIG. 2) which is secured to the vehicle body 18 in a manner not shown. A sub-assembly comprising a shaft and a seat belt webbing spool fixed for rotation with the shaft, hereinafter referred to as spool 42, is rotatably mounted on the frame 40. The seat belt webbing 16 is wound on the spool 42. The spool 42 is rotatable about an axis A in a belt webbing withdrawal (unwinding) direction B and a belt webbing retraction (winding) direction C. Two metal ratchet wheels 44 (only one shown) are fixed for rotation with the spool 42. Each ratchet wheel 44 has a circumferential array of sloped teeth 46. The seat belt retractor 12 further includes a rewind spring (not shown) which acts between the frame 40 and the seat belt webbing spool 42 to bias the spool and the ratchet wheels 44 to rotate in the belt webbing retraction direction C.

An actuatable locking mechanism 50 is mounted on the frame 40. The locking mechanism 50 provides a means for locking the spool 42 and the ratchet wheels 44 against rotation in the belt webbing withdrawal direction B. The locking mechanism 50 includes a pawl 52 having a mount end portion 54, a ratchet wheel engagement portion 56, and an actuator engagement portion 58. The mount end portion 54 of the pawl 52 is pivotally connected to the frame 40 by a pin 60 which extends from the frame.

The pawl 52 is pivotable between a release position (not shown) wherein the ratchet wheel engagement portion 56 is not in engagement with at least one of the ratchet wheels 44, and a blocking position (shown in FIG. 2) wherein the ratchet wheel engagement portion is in engagement with at least one of the ratchet wheels. When the pawl 52 is in the release position, rotation of the spool 42 and the ratchet wheels 44 in the belt webbing withdrawal direction B is permitted. When the pawl 52 is in the blocking position, rotation of the spool 42 and the ratchet wheels 44 in the belt webbing withdrawal direction B is blocked.

The pawl 52 is illustrated as being directly engageable with one or both of the ratchet wheels 44. However, it should be understood that an intermediate mechanism may be disposed between the pawl 52 and the ratchet wheels 44 such that the pivoting of the pawl activates the intermediate mechanism and causes rotation of the spool 42 in the belt webbing withdrawal direction B to be blocked. Such an intermediate mechanism, for example, is disclosed in U.S. Pat. No. 4,895,317, which is assigned to the assignee of the present invention.

The locking mechanism 50 further includes an electrically actuatable actuator 70. The actuator 70 is mounted on the frame 40 and is electrically connected by line 74 to an electrical power supply 72 in the vehicle, such as the vehicle's electrical system. An end portion 76 of the actuator 70 is movable between a plurality of positions, in one of which (shown in FIG. 2) the end portion engages the actuator engagement portion 58 of the pawl 52 and pivots the pawl into engagement with the teeth 46 on the ratchet wheel 44.

Figure 2:
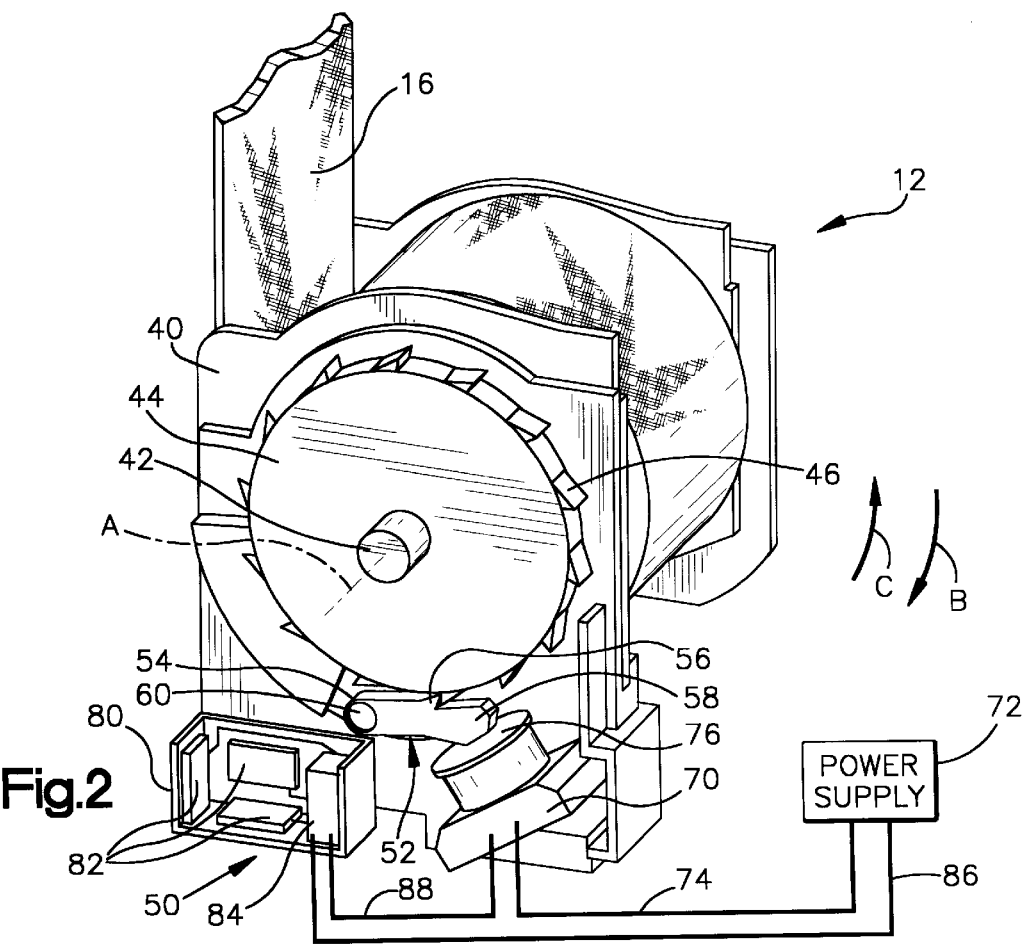
FIG. 2 is a perspective view of the seat belt retractor of FIG. 1.

A box-shaped enclosure 80 is also mounted on the frame 40 and contains three electronic accelerometer chips or accelerometers 82 and a controller 84. Portions of the enclosure 80 shown in FIG. 2 are omitted for clarity. The three accelerometers 82 are oriented in three perpendicular planes, respectively, as may be seen in FIG. 2. Each of the accelerometers 82 is electrically connected to the controller 84 and is operable to provide an electrical output signal to the controller indicative of vehicle deceleration in the respective plane in which each of the accelerometers is oriented.

The controller 84 is electrically connected by line 86 to the power supply 72 in the vehicle and to the actuator 70 by line 88. The controller 84 preferably comprises a known programmable control chip. The controller 84 is operable to monitor the electrical output signals from each of the accelerometers 82. Upon the occurrence of a predetermined amount of vehicle deceleration, the controller 84 is operable to send an electrical signal to the actuator 70 which causes the actuator to actuate and move the pawl 52 from the release position to the blocking position.

The controller 40 is programmed with an appropriate algorithm to calculate continuously the direction and magnitude of a force vector acting on the retractor 12 due to gravity, also known as the G-vector, in relation to the retractor. This feature allows the retractor 12 to function properly irrespective of its mounting position or location. Whichever direction the G-vector is pointing when the locking mechanism 50 is electrically energized (i.e., the vehicle is turned on) is used as a temporary reference which is then continuously updated during vehicle use. The direction of the G-vector can change gradually, as it might if the vehicle were being driven up a steep hill. If, however, the magnitude of the G-vector changes abruptly enough to exceed the predetermined deceleration level, the controller 84 will signal the actuator 70 to lock the retractor 12. Further, the controller 84 could be programmed to minimize its reaction to deceleration in certain directions, such as the vertical direction for an off-road vehicle.

The electrically actuated retractor 12 described above is characterized by its independent or autonomous operation in that the retractor has its own deceleration sensor 82 and associated controller 84 and thus operates independent of any other collision sensors in the vehicle. The independent operability of the retractor 12 has several advantages. First, as mentioned above, the retractor 12 provides a common device that can be mounted in any number of positions and thus can be used in a wide variety of seating locations. Second, the retractor 12 simplifies the complex structure typically used in "special" retractor applications such as in a vehicle seat back or in an off-road vehicle. Such complex structure typically includes multiple ball sensors and their matching levers, links, and sensor housings which are eliminated in the retractor 12 according to the present invention. Further, the attendant costs of engineering, developing, tooling, certifying, and manufacturing seat belt retractors for various special applications is eliminated. Finally, the electrical connection of the retractor 12 to the vehicle electrical system could be used to run a periodic diagnostic check on the retractor.

Figure 3:
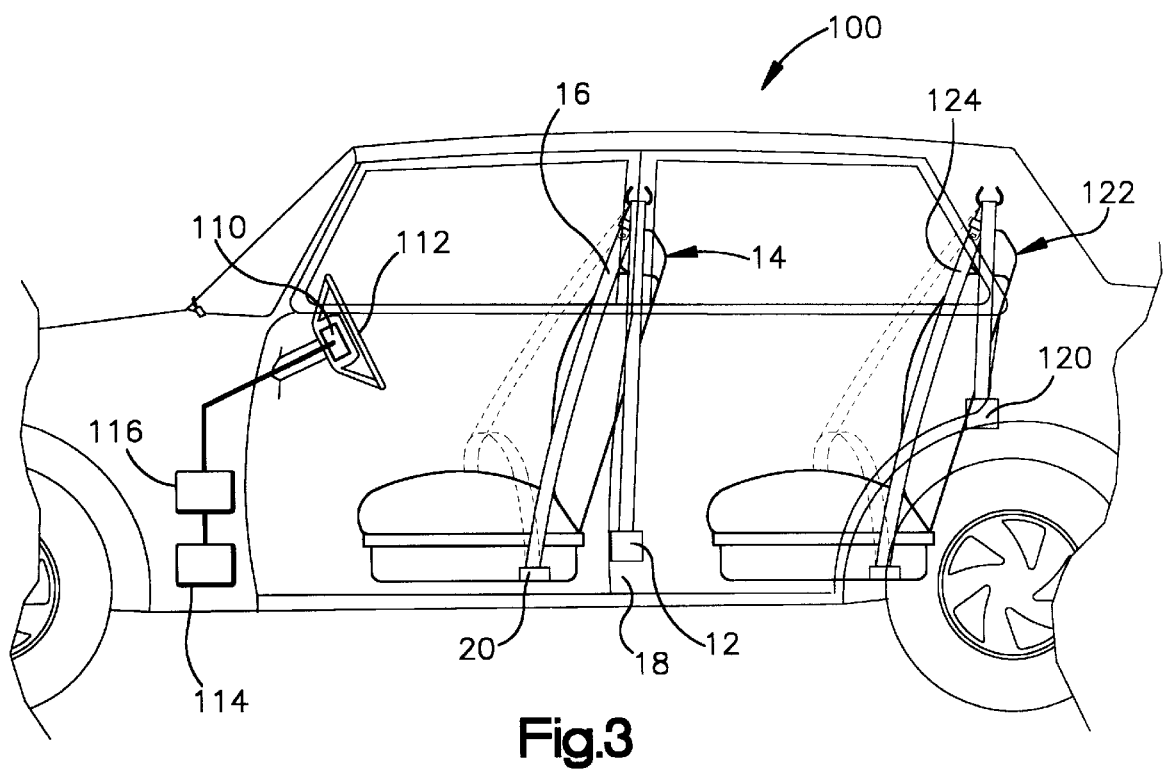
FIG. 3 is a fragmentary schematic illustration of a vehicle equipped with the seat belt retractor of FIG. 2.

The retractor 12 can also be used as a part of a vehicle occupant protection system or apparatus 100 illustrated schematically in FIG. 3. The apparatus 100 includes an inflatable vehicle occupant protection device, such as an air bag 110. The air bag 110 is illustrated as being mounted in a vehicle steering wheel 112, but could instead be mounted in the vehicle instrument panel, the vehicle door, the roof, or any other known location for mounting an air bag. The air bag 110 is thus spaced from the retractor 12.

The apparatus 100 further includes a collision sensor 114 and an air bag controller 116 mounted in locations spaced from the retractor 12. The collision sensor 114 may be an accelerometer similar to the accelerometers 82 described above, or another known sensor for sensing vehicle deceleration. The collision sensor 114 is operatively coupled to the air bag controller 116 and sends electrical output signals to the air bag controller indicative of vehicle deceleration. The air bag controller 116 preferably comprises a microcomputer and is operatively coupled to the air bag 110. The air bag controller 116 monitors the electrical output signals from the collision sensor 114 and, upon the occurrence of a predetermined amount of vehicle deceleration, actuates the air bag 110 as is known in the art. The air bag 110 and the retractor 12 are thus independently actuated based on the deceleration sensed by their respective sensing devices 114 and 82 and respective independent controllers 116 and 84.

The apparatus 100 further includes a second retractor 120 mounted in a location spaced from the retractor 12 such as adjacent a rear seat 122 in the vehicle. The second retractor 120 is associated with a second seat belt webbing 124 for helping to protect an occupant of the rear seat 122. The second retractor 120 is identical in structure and function to the retractor previously described. The second retractor 120 thus operates independently of the retractor 12 and the air bag 110 in the vehicle occupant protection apparatus 100.

Figure 4:
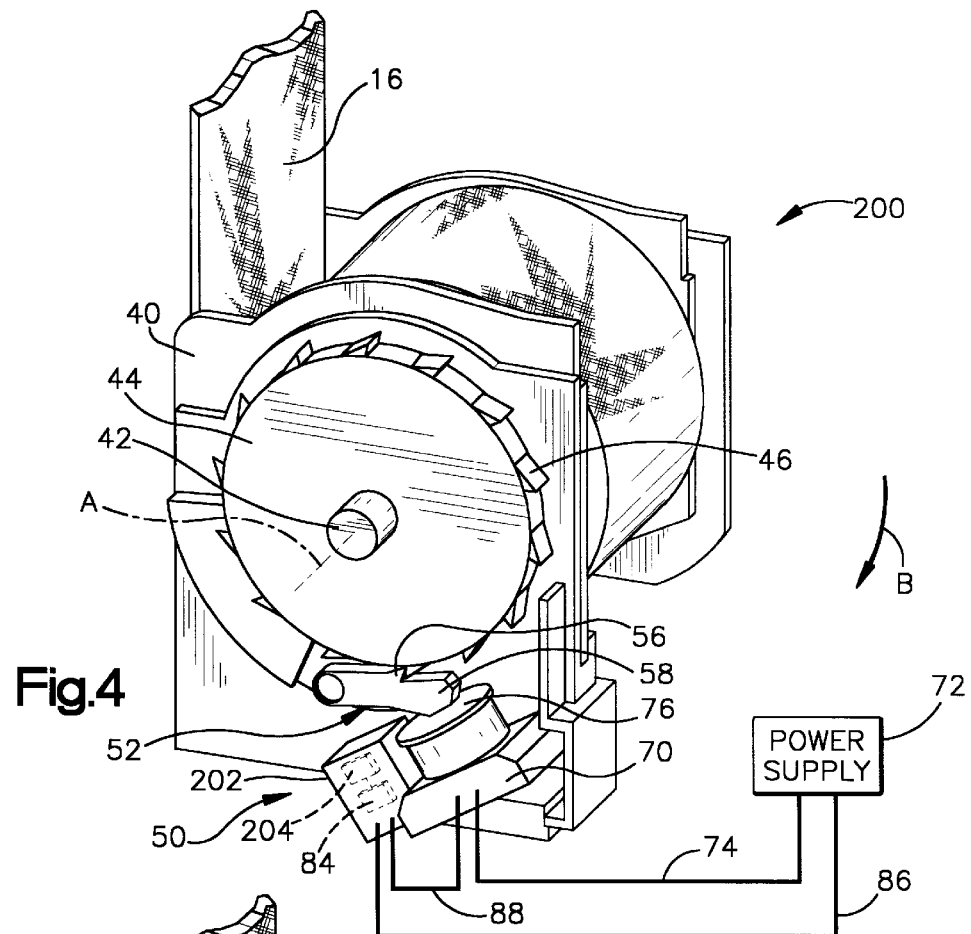
FIG. 4 is a view similar to FIG. 2 showing a second embodiment of a seat belt retractor constructed in accordance with present invention.

FIG. 4 illustrates a second embodiment of a seat belt retractor 200 constructed in accordance with the present invention. In the embodiment of FIG. 4, structure which is identical to structure in the previous embodiment is identified with the same reference numerals.

The seat belt retractor 200 has a box-shaped enclosure 202 which contains an integrated three-axis accelerometer 204 and a separate controller 84. The enclosure 202 is illustrated as being mounted to the actuator 70, but could also be mounted to the frame 40. The three-axis accelerometer 204 comprises a single chip which can sense deceleration in three perpendicular planes, and thus replaces the three accelerometers 82 utilized in the previous embodiment.

The retractor 200 according to the second embodiment functions identically to the retractor 12 of the previous embodiment and offers the same advantages discussed above. In addition, the three-axis accelerometer 204 reduces the number of parts in the retractor 200.

Figure 5:
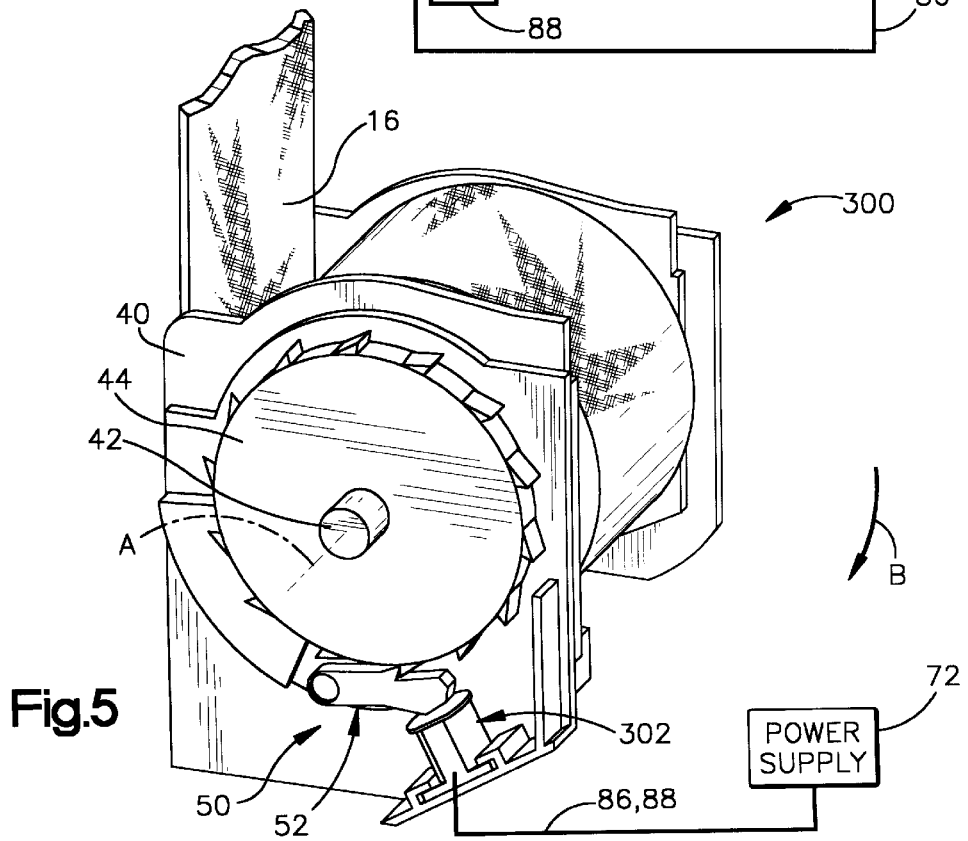
FIG. 5 is a view similar to FIG. 4 showing a third embodiment of a seat belt retractor constructed in accordance with present invention.

FIG. 5 illustrates a third embodiment of a seat belt retractor 300 constructed in accordance with the present invention. In the embodiment of FIG. 5, structure which is identical to structure in the previous embodiments is identified with the same reference numerals.

The seat belt retractor 300 has a single integrated component 302 which includes a three-axis accelerometer, a controller, and a miniature impulse-type actuator. The miniature impulse-type actuator employs capacitive discharge circuitry to amplify actuation force. The retractor 300 according to the third embodiment functions identically to the retractors 12, 200 of the previous embodiments and offers the same advantages. In addition, the integration of the three-axis accelerometer, the controller, and the actuator into a single component 302 further reduces the number of parts in the retractor 300. It should be understood that the three-axis accelerometer could be integrated with the controller into a single component while the actuator remains a separate component.

From the above description of the invention, those skilled in the art will perceive improvements, changes and modifications. For example, it should be understood that a vehicle occupant protection system could use a seat belt retractor constructed in accordance with the present invention for each seat in the vehicle. Such improvements, changes and modifications within the skill of the art are intended to be covered by the appended claims.

Having described the invention, we claim:

1. A seat belt retractor comprising:
a frame;
a seat belt webbing spool rotatably mounted in said frame;
actuator means for locking said seat belt webbing spool against rotation in at least one direction in said frame, said actuator means being mounted to said frame;
accelerometer means for providing an electrical output signal indicative of vehicle deceleration, said accelerometer means being mounted on said frame; and
controller means for monitoring said electrical output signal and for causing said actuator to lock said seat belt webbing spool against rotation in said at least one direction upon the occurrence of a predetermined amount of vehicle deceleration, said controller means being mounted on said frame.

2. The seat belt retractor of claim 1 wherein said accelerometer means comprises a three-axis accelerometer which senses deceleration in three perpendicular planes.

3. The seat belt retractor of claim 1 wherein said accelerometer means comprises three accelerometer chips mounted in three perpendicular planes, respectively.

4. The seat belt retractor of claim 1 wherein said controller means comprises a programmable control chip.

5. The seat belt retractor of claim 1 wherein said accelerometer means and said controller means are physically separate components which are mounted in an enclosure spaced from said actuator means.

6. The seat belt retractor of claim 1 wherein said accelerometer means and said controller means are physically separate components which are mounted to said actuator means.

7. The seat belt retractor of claim 1 wherein said accelerometer means and said controller means are integrated into a single component.

8. The seat belt retractor of claim 1 wherein said accelerometer means, said controller means and said actuator means are integrated into a single component.

9. An apparatus for use in a vehicle, said apparatus comprising:
a first seat belt retractor mounted in a first location in the vehicle, said first seat belt retractor having a first frame and a first seat belt webbing spool rotatably mounted in said first frame;
a first actuator mounted on said first frame, said first actuator being movable between a plurality of positions in one of which said first actuator causes said first seat belt webbing spool to be locked against rotation in at least one direction in said first frame;
first electronic accelerometer means for providing an electrical output signal indicative of vehicle deceleration, said first electronic accelerometer means being mounted to said first frame;
a first controller mounted on said first frame for monitoring said electrical output signal from said first electronic accelerometer means and for causing said first actuator to move to said one position to lock said first seat belt webbing spool against rotation in said at least one direction upon the occurrence of a predetermined amount of vehicle deceleration;
an actuatable inflatable vehicle occupant protection device module mounted in the vehicle and spaced from said first seat belt retractor;
sensor means for sensing vehicle deceleration and for providing an electrical output signal indicative of vehicle deceleration, said sensor means being mounted in a second location in the vehicle spaced from said first location; and
a second controller operatively coupled to said inflatable vehicle occupant protection device and to said sensor means, said second controller monitoring said electrical output signal from said sensor means and actuating said inflatable vehicle occupant protection device upon the occurrence of a predetermined amount of vehicle deceleration.

10. The apparatus of claim 9 further comprising:
a second seat belt retractor mounted in a third location spaced from said first and second locations, said second seat belt retractor having a second frame and a second seat belt webbing spool rotatably mounted in said second frame;
a second actuator mounted on said second frame, said second actuator being movable between a plurality of positions in one of which said second actuator causes said second seat belt webbing spool to be locked against rotation in said at least one direction in said second frame;
second electronic accelerometer means for providing an electrical output signal indicative of vehicle deceleration, said second electronic accelerometer means being mounted on said second frame; and
a third controller mounted on said second frame for monitoring said electrical output signal from said third electronic accelerometer means and for causing said second actuator to move to said one position to lock said second seat belt webbing spool against rotation in said at least one direction upon the occurrence of a predetermined amount of vehicle deceleration.

11. The apparatus of claim 10 wherein said each of first and second electronic accelerometer means comprises a three-axis accelerometer which senses deceleration in three perpendicular planes.

12. The apparatus of claim 10 wherein said each of first and second electronic accelerometer means comprises three accelerometer chips mounted in three perpendicular planes, respectively.

13. The apparatus of claim 10 wherein said first and second controllers comprise programmable control chips.

14. The apparatus of claim 10 wherein said first electronic accelerometer means and said first controller are physically separate components which are mounted in an enclosure spaced from said first actuator.

15. The apparatus of claim 10 wherein said first electronic accelerometer means and said first controller are physically separate components which are mounted to said first actuator.

16. The apparatus of claim 10 wherein said first electronic accelerometer means and said first controller are integrated into a single component.

17. The apparatus of claim 10 wherein said first electronic accelerometer means, said first controller and said first actuator are integrated into a single component.

18. An apparatus for use in a vehicle, said apparatus comprising:

a first seat belt retractor mounted in a first location in the vehicle, said first seat belt retractor having a first frame and a first seat belt webbing spool rotatably mounted in said first frame;

a first actuator mounted on said first frame, said first actuator being movable between a plurality of positions in one of which said first actuator causes said first seat belt webbing spool to be locked against rotation in at least one direction in said first frame;

first electronic accelerometer means for providing an electrical output signal indicative of vehicle deceleration, said first accelerometer means being mounted on said first frame;

a first controller mounted on said first frame for monitoring said electrical output signal and for causing said first actuator to move to said one position to lock said first seat belt webbing spool against rotation in said at least one direction upon the occurrence of a predetermined amount of vehicle deceleration;

a second seat belt retractor mounted in a second location spaced from said first location, said second seat belt retractor having a second frame and a second seat belt webbing spool rotatably mounted in said second frame;

a second actuator mounted on said second frame, said second actuator being movable between a plurality of positions in one of which said second actuator causes said second seat belt webbing spool to be locked against rotation in said at least one direction in said second frame;

second electronic accelerometer means for providing an electrical output signal indicative of vehicle deceleration, said second electronic accelerometer means being mounted on said second frame; and a second controller mounted on said second frame for monitoring said electrical output signal and for causing said second actuator to move to said one position to lock said second seat belt webbing spool against rotation in said at least one direction upon the occurrence of a predetermined amount of vehicle deceleration.

* * * * *

UNITED STATES PATENT AND TRADEMARK OFFICE
CERTIFICATE OF CORRECTION

PATENT NO. : 6,550,810 B1
DATED : April 22, 2003
INVENTOR(S) : Barney J. Bauer and Roger H. Garrell It is certified that error appears in the above-identified patent and that said Letters Patent is hereby corrected as shown below:

Column 6,
Line 66, after "claim" delete "10" and insert -- 9 --.

Column 7,
Lines 3, 7, 9, 13, 17 and 20, after "claim" delete "10" and insert -- 9 --.

Signed and Sealed this

Sixteenth Day of November, 2004

JON W. DUDAS
*Director of the United States Patent and Trademark Office*